United States Patent [19]
Reimert

[11] Patent Number: 5,332,002
[45] Date of Patent: Jul. 26, 1994

[54] GATE VALVE

[75] Inventor: Larry E. Reimert, Houston, Tex.

[73] Assignee: Dril-Quip, Inc., Houston, Tex.

[21] Appl. No.: 125,031

[22] Filed: Sep. 21, 1993

[51] Int. Cl.⁵ .............................................. F16K 3/00
[52] U.S. Cl. ........................... 137/614.11; 137/614.21; 251/328
[58] Field of Search .............. 137/613, 614.11, 614.19, 137/614.21; 251/326, 328, 210

[56] References Cited
U.S. PATENT DOCUMENTS

| | | | |
|---|---|---|---|
| 3,152,760 | 10/1964 | Bowman | 137/614.11 X |
| 3,194,269 | 7/1965 | Williams | 137/614.11 |
| 4,824,074 | 4/1989 | Baugh | 251/328 X |
| 4,856,551 | 8/1989 | Bräkelmann | 137/614.19 X |
| 5,037,064 | 8/1991 | Pond | 251/328 X |
| 5,094,270 | 3/1992 | Reimert | 137/614.11 |
| 5,135,032 | 8/1992 | Parks, Jr. | 251/210 X |

*Primary Examiner*—Martin P. Schwadron
*Assistant Examiner*—Kevin L. Lee
*Attorney, Agent, or Firm*—Vaden, Eickenroht, Thompson, Boulware & Feather

[57] ABSTRACT

There is disclosed two embodiments of a gate valve having a pair of parallel-sided gates for opening and closing a flowway through the valve body upon reciprocation within a gate cavity intersecting the flowway intermediate its ends. The gates are connected to an actuator stem by a lost motion connection which causes one to be moved from closed toward open position prior to the other, and the one gate has a passageway therein for moving into a position to connect the cavity with the flowway prior to movement of the gates together toward open position.

10 Claims, 3 Drawing Sheets

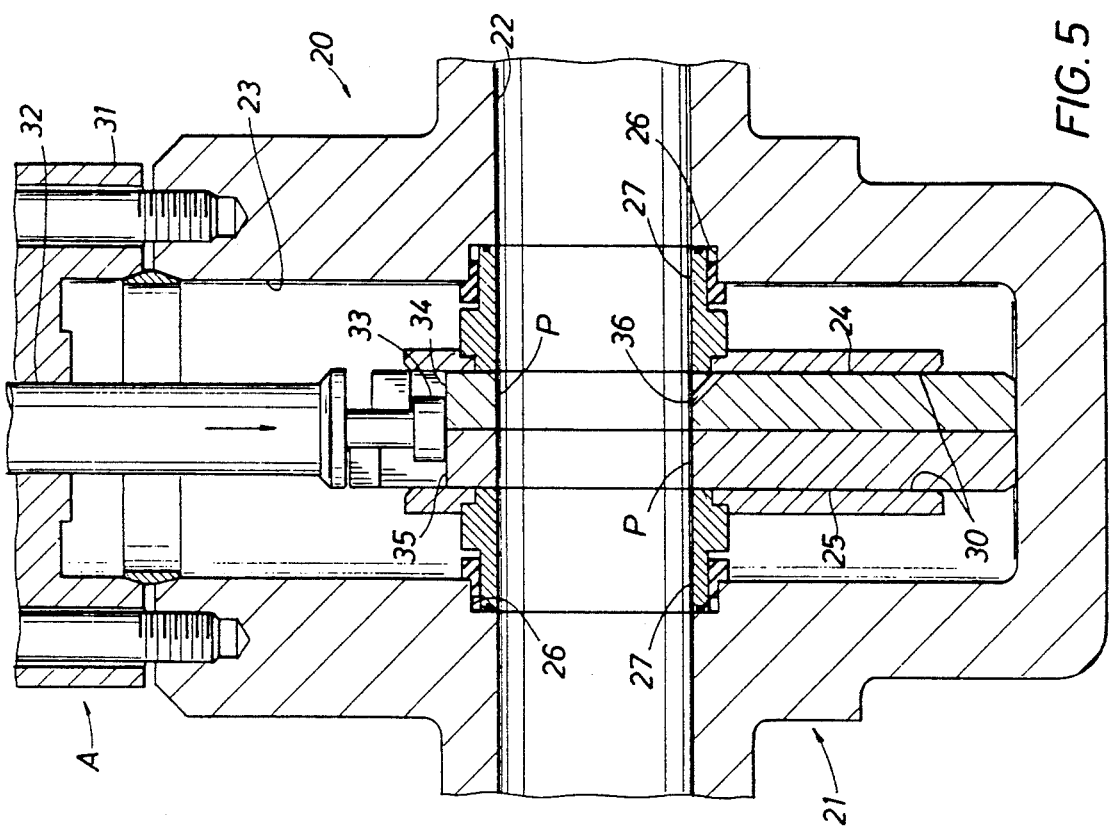
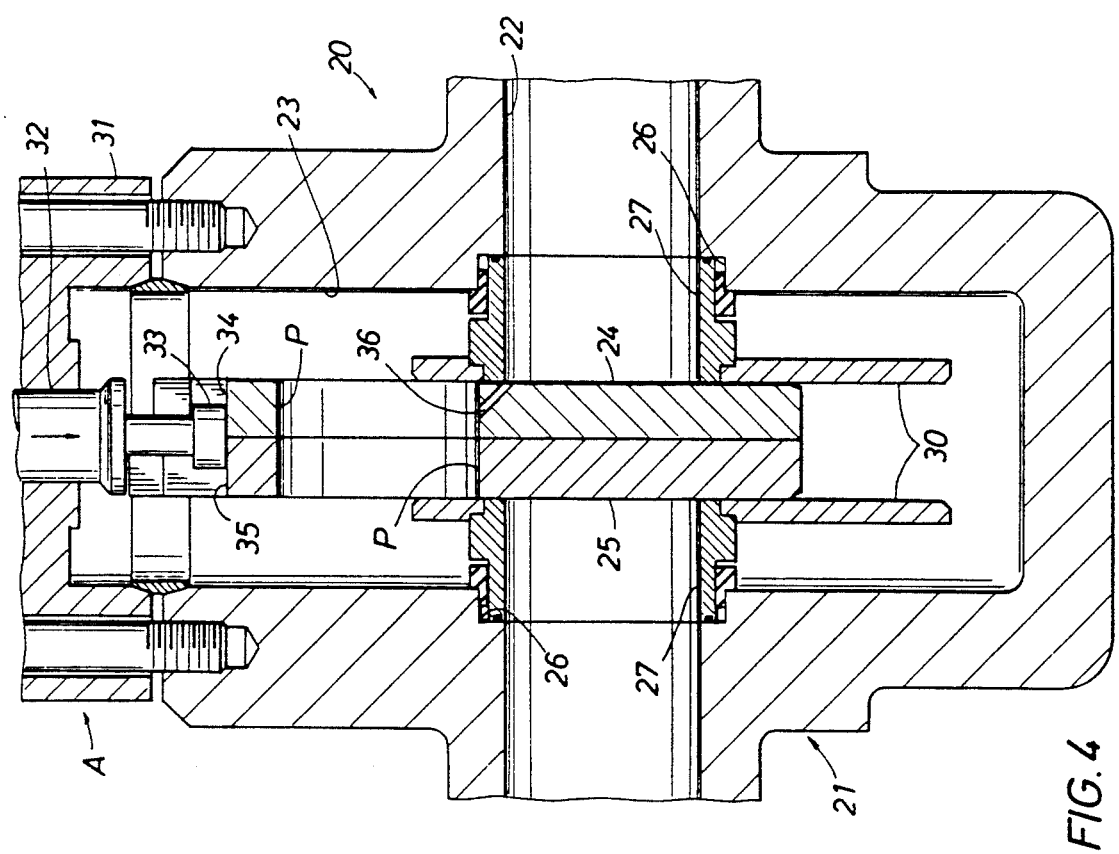
FIG. 5
FIG. 4

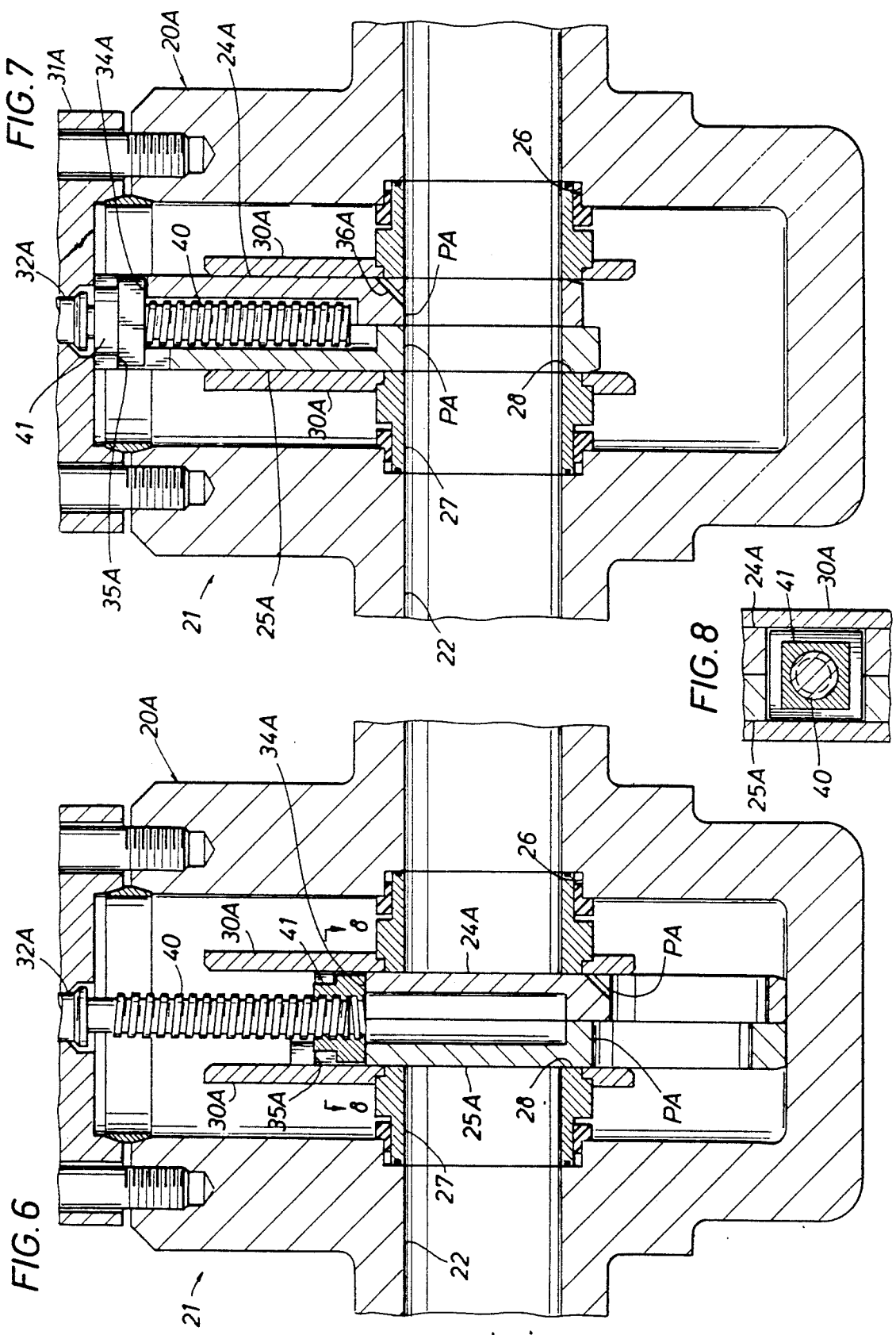

GATE VALVE

This invention relates generally to gate valves, and, more particularly, to improvements in gate valves of the type having parallel-sided gates whose outer sides are tightly engaged with seating surfaces about the intersection of the flowway through the valve body with the body cavity in which the gates reciprocate to open and close the valve.

The purpose of gate valves of this type, as compared with more conventional single-gated valves, is that they seal against a predominant pressure on either side and exclude debris which might otherwise collect in the cavity. Also, they permit the cavity to be pressure-tested without the need for plugs in each end of the body flowway. However, because of friction between the outer sides of both gates and the body seating surfaces, due to pressure in the cavity, as well as compression springs or the like which may be disposed between their inner sides, the force required to operate gate valves of this type is normally double that required to operate a single-gated valve.

In an effort to overcome this problem, double gate valves have been proposed in which the outer sides of the gates are tapered to permit them to be wedged tightly between similarly tapered sides in the valve body cavity as the gates are moved to closed position. More particularly, the actuator for the gates permits them to be operated independently of one another so that one may be moved into and out of opened and closed positions before the other. Although this permits the second gate to be so moved to open position by overcoming only the friction between its outer side and its seating surface, in order to move the first gate from its closed position, it is necessary to exert a large force to cause its outer side to "break away" from the seating surface in the valve body.

The primary object of this invention is to provide a valve of this type having parallel side gates which is of such construction as to require considerably less force to open the gates and, more particularly, in which the actuator need only provide the force which would be required to open a gate valve having a single gate.

A more particular object is to provide such a valve having an actuator requiring only a single stem and of otherwise simple construction.

These and other objects are accomplished, in accordance with the illustrated and preferred embodiments of the invention, by a double gate valve of the type described wherein the means for moving the gates between opened and closed positions includes means for moving a first of the gates from its closed toward its open position prior to moving the second gate from its closed toward open position and then moving the gates together to their closed position, and a means for venting the cavity to the flowway on the outer side of one of the gates prior to movement of the second gate from its closed toward its open position. Thus, as the gates are moved together, their outer sides are no longer urged by cavity pressure against the seating surfaces, so that the only pressure-induced friction during opening movement is that encountered by the first gate as it moves to the venting position.

Preferably, the venting means comprises a passageway in the first gate to vent the cavity to the outer side of the first gate. In the illustrated embodiments, the gates have ports therethrough alignable with one another and the flowways, and the passageway is a hole in the first gate connecting its port with its outer side.

As also shown and described, the moving means comprises an actuator having a stem extending into the cavity and having its inner end connected to the gates by a lost motion connection which permits the first gate to be moved toward its open position before the second gate. More particularly, the lost motion connection comprises a laterally enlarged part on the inner end of the stem received within lateral slots in the ends of the gates, with the slot in the second gate having greater longitudinal extent than the slot in the first gate to permit the first gate to move first to venting position. In one embodiment, the stem is mounted for reciprocation without rotation in the body, and the enlargement is a "T" on its inner end. In a second embodiment, the stem is mounted for rotation without longitudinal movement in the body, and the enlargement is a nut which is held against rotation by the gates and threadedly connected to the stem.

As also disclosed, the body has annular recesses about the flowway on each side of the cavity, and an annular seat is received in each recess to provide the seating surface on its inner end.

In the drawings, wherein like reference characters are used throughout to designate like parts:

FIG. 4 is a view of the valve similar to that of FIG. 1, but with the first gate moved to venting position;

FIG. 5 is another view similar to FIGS. 1 and 4, but with both gates moved to open position;

FIG. 6 is a vertical sectional view of the second embodiment of the gate valve, with the gates closed;

FIG. 7 is a view similar to FIG. 6, but with the gates open; and

FIG. 8 is a partial sectional view of the valve similar to FIG. 7, but in closed position.

Figure 1:
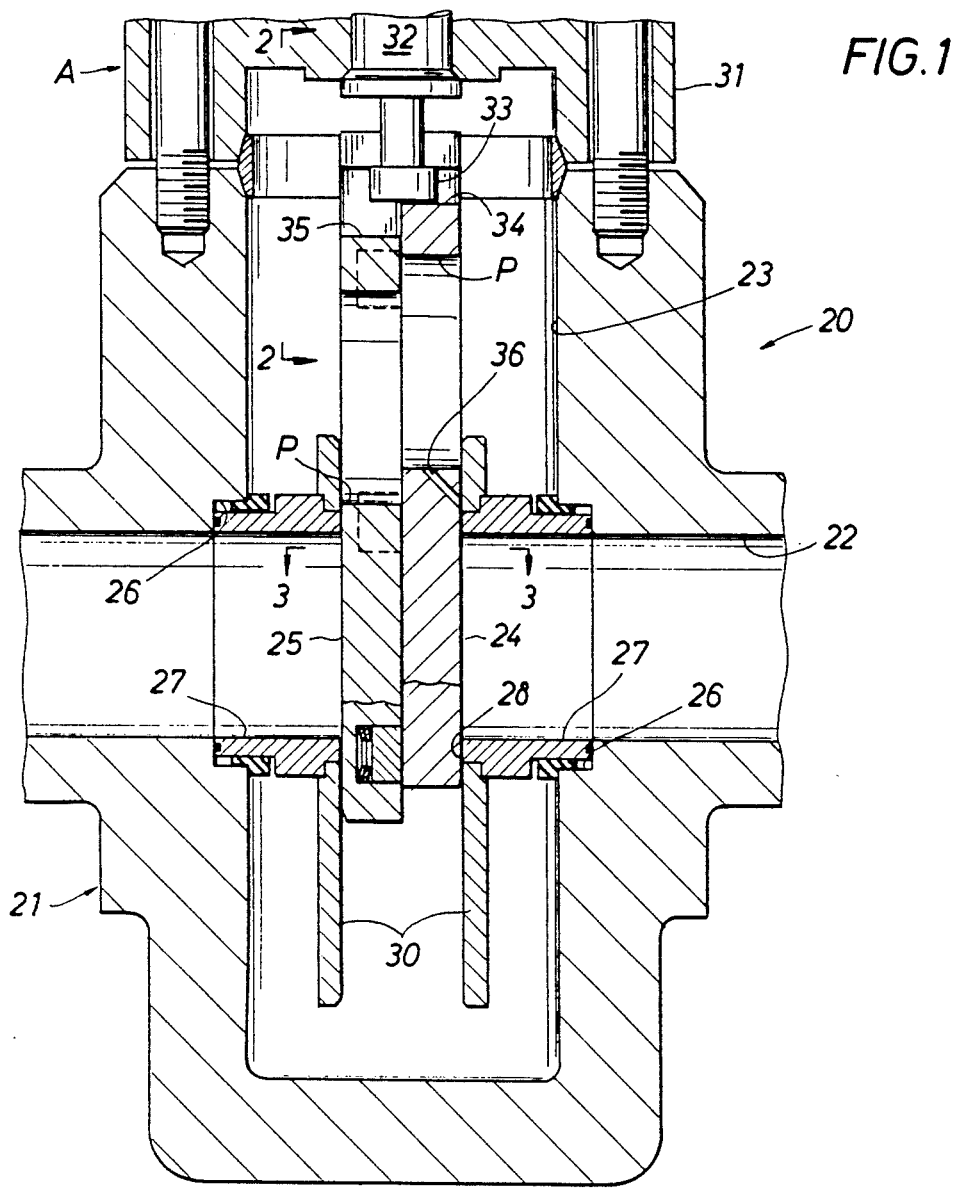
FIG. 1 is a vertical sectional view of a gate valve constructed in accordance with the first embodiment of the invention, with the gates shown in closed positions.
Figure 2:
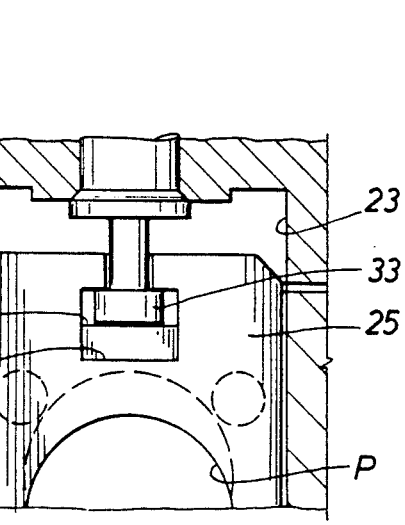
FIG. 2 is a partial sectional view of the valve of FIG. 1, as seen along broken lines 2—2 of FIG. 1.

With reference now to the details of the above described drawings, the embodiment of the valve shown in FIGS. 1 to 5, and indicated in its entirety by reference character 20, comprises a valve body 21 having a flowway 22 therethrough and a cavity 23 therein intersecting the flowway intermediate its ends, together with gates 24 and 25 which are adapted to be moved between the position of FIG. 1 to close the valve and the position of FIG. 5 to open the valve. As shown, the parallel-sided gates have ports P therethrough near their upper end which are aligned with one another and the flowway to open the valve in the position of FIG. 1 and which are raised within the cavity to dispose the solid portions of the lower ends of the gates across the flowway to close it in the position of FIG. 5.

Figure 3:
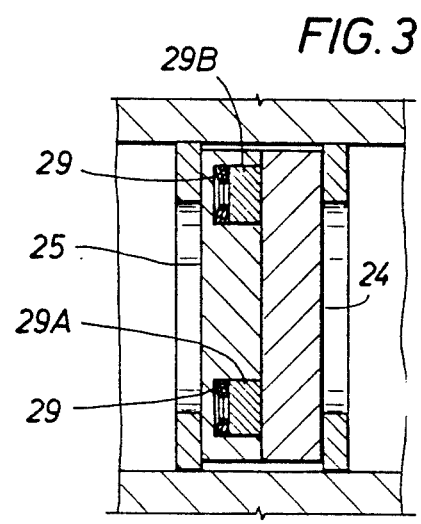
FIG. 3 is another partial sectional view of the valve of FIG. 1, as seen along broken lines 3—3 of FIG. 1.

Annular recesses 26 are formed in the body to surround each flowway at its intersection with the cavity 23, and an annular seat 27 is received in each recess to provide a seating surface 28 on its inner end between which the outer sides of the gates are guidably movable between their opened and closed positions. As previously described, the gates are yieldably urged apart, as by means of springs acting between the gates to force their outer sides against the seating surfaces 28. Thus, as best shown in FIG. 3, stacks of Bellville washers 29 are received in pockets 29A in the inner face of gate 25 to force buttons 29B on their ends against the inner side of gate 24. Guide plates 30 are mounted on the inner ends of the seats to provide guiding surfaces for the gates as they move between opened and closed positions.

The valve 20 further includes an actuator A having a body 31 mounted on the valve body to close the open upper end of the cavity 33, and a stem 32 extending through the body for connection at its inner end to the gates 24 and 25 in order to move them between their open and closed positions, as will be described to follow. In this embodiment of the invention, the actuator stem 23 is caused to reciprocate without rotation in the body by means not shown, such as a piston mounted in a cylinder of the body 31.

The lower end of the stem 32 has an enlargment in the form of a "T" 33 at its lower end which fits within slots 34 and 35 at the upper ends of the gates 24 and 25, respectively, which permits the gates to be moved into and out of the mounted position on the stem in an obvious manner. As shown, the slot 35 is of greater longitudinal extent than the slot 34, with the slot 34 being of just sufficient longitudinal extent to closely receive the "T" 33 so that, upon downward or inward movement of the stem 32 of the actuator, the gate 24 is caused to move from its closed toward its opened position prior to movement of the gate 25. During this time, the actuator need overcome only the friction between the outer side to the gate 24 and the seating surface of the seat 26, due to the force of the springs as well as the predominant pressure in the cavity.

As also previously described, a hole 36 is formed in the gate 24 to connect its port P and thus the cavity 23 with its outer side. More particularly, the lower end of the hole intersects the outer side of the gate 24 at such a location that, as shown in FIG. 4, it connects with the opening through the right-hand seat 27 prior to engagement of the lower end of the "T" 33 with the lower end of the slot 35 in the gate 25. Hence, predominant pressure in the cavity 23 is vented to the flowway prior to movement of the stem further downwardly to begin to move the left-hand gate 25 from its closed to its open position.

When the stem has been moved downwardly to the position of FIG. 5 to cause the cavity pressure to be vented, its continued downward movement will, through its engagement with the lower sides of both slots 34 and 35, simultaneously move both of them downwardly to the open position of FIG. 5. Since the predominant cavity pressure is no longer urging the gates apart, both may be moved downwardly against only minor friction between the outer sides of the gates and the seating surfaces with which they are engaged.

Since the valve has not been closed, pressure has not built up in the cavity 23, and hence there is no particular problem in moving the gates back to their closed positions. Thus, upon raising of the stem from the position of FIG. 5, the "T" 33 will first raise the gate 24 until the "T" engages the upper side of the slot 35 formed in the upper end of gate 25, following which it will move both gates to their fully closed positions, as shown in FIG. 1.

The alternative embodiment of the valve shown in FIGS. 6 to 8, and designated in its entirety by reference character 20A, differs from the valve 20 primarily in the manner in which the gates are moved between opened and closed positions. Hence, many of its parts are designated with the same numbers as those in the valve 20. Thus, for example, in the valve 20A the side-by-side gates 24A and 25A have through ports PA formed in their lower ends so that they are lowered to closed position (FIG. 6) and raised to open position (FIG. 7). Due to this reversal of movement, the guides 30A extend upwardly rather than downwardly in the cavity 23 as in the case of the guides 30 for the valve 20.

The actuator for the valve 20A comprises a body 31A which is mounted on the valve body 21A and which has a stem 32A extending through the actuator body and into the cavity 23. As compared with the actuator stem 32, stem 32A is rotatable without reciprocation, and is provided with threads 40 about its inner end which are engaged with a nut 41 received in slots 34A and 35A in the upper ends of the gates 24A and 25A to provide a lost motion connection. More particularly, the nut has flat sides which are adjacent the guides 31A to hold it against rotation so that it is moved vertically on the stem in response to rotation of the stem by any suitable means at the upper end of the actuator. As shown, the inner sides of the gates are recessed to accommodate the end of the stem as the gates are raised to their upper open positions (FIG. 7).

More particularly, and as in the case of the valve 20, the slot 34A in the upper end of the gate 24A is of lesser longitudinal extent than the slot 35A in the upper end of the gate 35A. Consequently, as the stem 32 is rotated so as to move the gates from the closed position of FIG. 6 to the open position of FIG. 7, the enlarged portion of the nut 41 will first engage the upper side of the slot 34A to begin to move the right-hand gate 24A upwardly before moving the left-hand gate 25A toward its open position, and then begin to move both gates toward open position. Furthermore, and as in the case of the valve 20, a hole 36A is formed in the gate 24A to connect its port PA with its outer side with the outer end of the hole being so located as to connect the port and thus the cavity 23 in the valve body with the right-hand side of the gate 24A, and thus the flowway, before the upper end of the nut engages the lower side of the upper end of the slot 35A. As was also true of the valve 20, the valve 20A includes springs (not shown) arranged similarly to those described in connection with the valve 20 for urging the gates apart.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A gate valve, comprising
a body having a flowway therethrough, and a cavity therein intersecting the flowway intermediate its ends,
means forming annular seating surfaces in the body cavity at its intersection with the inner ends of the flowway,
means for opening and closing the flowway including a pair of gates each having parallel sides and guidably slidable within the cavity between the seating surfaces between positions opening and closing the flowway, means for moving a first gate from its closed toward its open position prior to moving the second gate from its closed toward open position and then moving the gates together to their open position, and means for venting the cavity to the flowway on the outer side of one of the gates prior to movement of the second gate from its closed toward its open position.

2. A gate valve of the character set forth in claim 1, including means yieldably urging the gates apart to force their outer sides against the seating surfaces.

3. A gate valve of the character set forth in claim 1, wherein the venting means comprises a passageway in the first gate to vent the cavity to the outer side of the first gate.

4. A gate valve of the character set forth in claim 1, wherein the moving means comprises an actuator having a stem extending into the cavity and having its inner end connected to the gates by a lost motion connection which permits the first gate to be moved toward its open position before the second gate.

5. A gate valve of the character set forth in claim 4, wherein the lost motion connection comprises a laterally enlarged part on the inner end of the stem received within lateral slots in the ends of the gates, with the slot in the second gate having greater longitudinal extent than the slot in the first gate.

6. A gate valve of the character set forth in claim 5, wherein the stem is mounted for reciprocation without rotation in the body, and the enlargement is a "T" on its inner end.

7. A gate valve of the character set forth in claim 5, wherein the stem is mounted for rotation without longitudinal movement in the body, and the enlargement is a nut which is held against rotation and threadedly connected to the stem.

8. A gate valve of the character set forth in claim 1, wherein the gates have ports through one end adapted to be aligned with one another on the flowway when in open position.

9. A gate valve of the character set forth in claim 8, wherein the venting means comprises a hole in the first gate connecting its port with its outer side.

10. A gate valve of the character set forth in claim 1, wherein the body has annular recesses about the flowway on each side of the cavity, and an annular seat is received in each recess to provide the seating surface on its inner end.

* * * * *